June 24, 1969

D. O. SMITH 3,451,740

MAGNETO-OPTICAL LIGHT SWITCH ENHANCED BY OPTICAL
IMPEDANCE MATCHING DIELECTRIC OVERLAYERS

Filed April 19, 1965

INVENTOR
DONALD O. SMITH

BY,
*Edward D. Thomas*

AGENT

United States Patent Office 3,451,740
Patented June 24, 1969

3,451,740
MAGNETO-OPTICAL LIGHT SWITCH ENHANCED BY OPTICAL IMPEDANCE MATCHING DIELECTRIC OVERLAYERS
Donald O. Smith, Lexington, Mass., assignor to Massachusetts Institute of Technology, Cambridge, Mass., a corporation of Massachusetts
Filed Apr. 19, 1965, Ser. No. 448,961
Int. Cl. G02f 1/22
U.S. Cl. 350—151                    6 Claims

ABSTRACT OF THE DISCLOSURE

An apparatus for improving the mode conversion efficiency of the magneto-optical Kerr effects uses a very thin transparent magnetic film and a quarter-wave dielectric film optical impedance matching network positioned at the interface of an optical medium having a high index of refraction and an optical medium having a lower index of refraction to obtain minimum optical loss and maximum magneto-optical coupling by means of total internal reflection of polarized light incident at an angle slightly greater than the critical angle for total reflection to obtain stable reactive optical surface impedances.

---

The various magneto-optical effects have often been explored and various attempts have been made in the past to enhance the effect since the principle of magneto-optical sensing has had the capacity to solve problems involved in the application of external variable magnetic fields. Generally, the sensitivity of the magneto-optical method has been found useful only in very limited applications.

In my patent application, Ser. No. 348,453, filed Mar. 2, 1964, now U.S. Patent No. 3,393,957, I described methods for enhancing the longitudinal and polar magneto-optical effects which make use of very thin magnetic films positioned in an optical standing wave and coupled by means of a multilayer dielectric film optical system to the incident light beam in free space.

Briefly, the reflection of light in plane-parallel, thin-film structures which do not contain magnetic film is characterized by two non-interacting polarization modes; namely, a mode with the optical E vector parallel to the incidence plane and a mode with the optical E vector perpendicular to the incidence plane. If a magnetic film is present, these modes can interact with a transfer of energy from one mode to the other. In order to maximize this energy transfer, the loss due to optical absorption must be minimized. When a very thin magnetic film, thinner than the optical penetration depth, is positioned in an optical standing wave node such that the tangential $$\vec{E}_{\shortparallel} = 0$$

the optical loss is found to be minimized. Although the placement of a thin magnetic film in the optical standing wave can be optimized with respect to minimium optical loss and maximum magneto-optical coupling, actual mode conversion is limited by the very great mismatch between the incident light wave and the magnetic film. Further, the matching problem is one of dual-mode impedance matching for both the ⊥ and ∥ modes. Multilayer quarter-wave dielectric films of differing refractive indices are employed in an optical network to solve the coupling of the magnetic film to free space.

The present invention is concerned with an improved structure over those disclosed in my above-identified application. It is, therefore, a primary object of the present invention to provide a simple structure for improving the basic conversion efficiency and hence the sensitivity of magneto-optical mode conversion.

A more complete discussion of these phenomena can be found in my paper, "Magneto-optical Scattering From Multilayer Magnetic and Dielectric Films" published in Optica Acta, 1965.

Briefly, the condition tangential $$\vec{E}_{\shortparallel} = 0$$

requires that the surface impedance $$Z_{\shortparallel} = 0$$

and consequently the reflection coefficient $$r_{\shortparallel} = 1$$

a property generally associated with a mirror. The condition tangential $$\vec{E}_{\shortparallel} = 0$$

specifies further that this is an "electric" mirror.

Since tangential $$\vec{E}_{\perp}$$

is magneto-optically active, no advantage can be expected by making this field zero. In fact, it is anticipated that maximizing tangential $$\vec{E}_{\perp}$$

This suggests the use of tangential $$\vec{H}_{\shortparallel} = 0$$

i.e., a "magnetic" mirror for the ⊥ mode. Then the surface impedance $$Z_{\perp} = \infty$$

The mirror just described is called an $(EH)_{\shortparallel}$-mirror.

An $(EH)_{\shortparallel}$-mirror can be obtained by using the phenomena of total internal reflection. Consider the transmission of light from medium $j$ with index of refraction $n_j$ to medium $k$ with index $n_k$. If $n_j > n_k$ there exists a critical angle $\theta_{jc}$ at which all of the incident light of either mode of polarization is totally reflected; also for all angles greater than $\theta_{jc}$, all of the incident light is totally reflected. The theory of this effect shows that at $\theta_j = \theta_{jc}$ the surface impedances are such that the boundary between $j$ and $k$ is acting as a perfect $(EH)_{\shortparallel}$-mirror. Operation at exactly $\theta_{jc}$ is not practical since the impedances are changing infinitely rapidly with $\theta_j$, $n_j$ and $n_k$. However, a degree or so below $\theta_{jc}$ stable operation is possible and at the same time the boundary is still a good approximation to a perfect $(EH)_{\shortparallel}$-mirror. Placement of a very thin magnetic film at the boundary between $j$ and $k$ would then be optimum with respect to minimum optical loss and maximum magneto-optical coupling. However, as pointed out in my above-identified application, the actual mode conversion which would be achieved would be severely limited by the very great impedance mismatch which exists between the incident light and the magnetic film. This problem is met by a dielectric film optical network.

These and other features and advantages of the invention will be apparent from the following detailed description taken together with the accompanying drawing in which.

Figure 1:
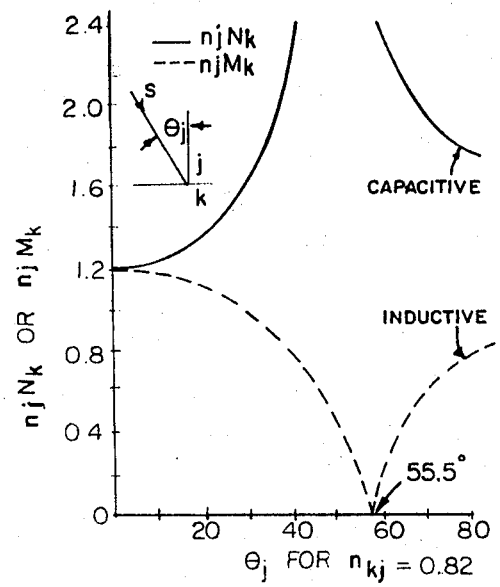
FIGURE 1 is a chart of the surface impedances of a rare medium for light incident at an angle $\theta_j$ from a dense medium.

In achieving the physical realization of an $(EH)_\parallel$-mirror by using the phenomena of total reflection and the dual-mode impedance matching by the use of quarter-wave dielectric films, reference is made to FIGURE 1. Here the surface impedances, $N_k$ for the perpendicular polarized mode and $M_k$ for the parallel mode, are shown for the transmission of light from a medium $j$ with an index of refraction $n_j$ to medium $k$ with index $n_k$, where $\theta_j$ is the angle of incidence of light beam S measured from the normal. Using Snell's law, $n \sin \theta = n_j \sin \theta_j$, the surface impedances are given by:

$$n_j N_k = (n^2_{kj} - \sin^2 \theta_j)^{-1/2}$$

$$n_j M_k = \frac{1}{n^2_{kj}} (n^2_{kj} - \sin^2 \theta_j)^{+1/2}$$

where $n_{kj} = n_k/n_j$.

When $n_{kj} < 1$, the condition $n_{kj} = \sin \theta_j$ defines a critical angle of incidence $\theta_{jc}$ at which $N_k \rightarrow \infty$ and $M_k \rightarrow 0$, which is just the definition of an $(EH)_\parallel$-mirror. Below the critical angle, the impedances become reactive.

Exactly at the critical angle the impedances are unstable in the sense that the impedances are changing infinitely rapidly with $\theta_j$, $n_j$ and $n_k$. However, a degree or so below $\theta_{jc}$, stable operation is possible and at the same time the boundary is still a good approximation to an $(EH)_\parallel$-mirror.

Figure 2:
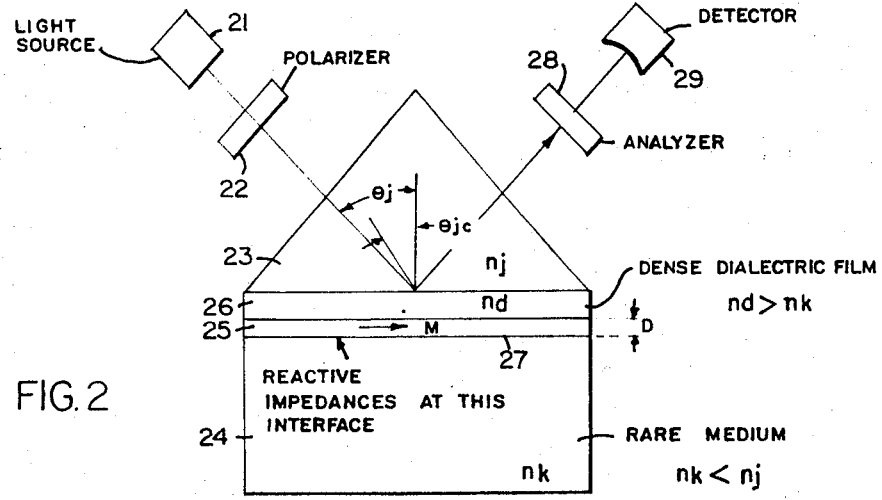
FIGURE 2 is a schematic diagram of one form of the invention using thin magnetic and dielectric films and total internal reflection.

FIGURE 2 illustrates schematically one structure for practicing the methods of the invention. A collimated source of light 21 is shown passing through a polarizing element 22, such as a dichroic sheet set with its transmission plane at right angles to the plane of incidence, before reaching prism 23 having an index of refraction $n_j$. A body 24 having an index of refraction $n_k$ which is less than $n_j$ sets up the condition of the transmission of light from a dense medium 23 to a rare medium 24.

From Snell's law the surface impedance at the top boundary 27 depends only on $n_k$, $n_j$ and $\theta_j$ and is not changed by the interposition of additional films between the rare medium and the dense medium. Consequently, a film of magnetic material 25 is shown between prism 23 and body 24 and having a magnetization M in the plane of the film and in a direction longitudinal to the plane of incidence. Also a quarter wave dielectric film 26 is shown interposed between the incident medium prism 23 and the magnetic film 25 for the purpose of transforming the dual-mode impedances.

The optical system is completed with an analyzer 28, which is another dichroic sheet set with its transmission plane substantially at right angles to that of polarizer 22; and a detector 29, which may be a photomultiplier tube.

The impedances of a thin film 25 on an $(EH)_\parallel$-mirror is very nearly $$Z_\perp = \frac{1}{DImn^2}$$

$$Z_\parallel = D(n_j \sin \theta_j)^2 \frac{Imn^2}{n^4} + i(D - \delta)$$

where
$n$ = index of refraction of the thin film
$D = 2\pi d/\lambda_0$
$d$ = thickness of the film
$\lambda_0$ = wavelength of the incident light
$\delta$ = mirror impedance of the $\parallel$ mode Now the mirror impedance $\delta$ is a function of the angle $\theta_j$ and hence by selection of the angle of incidence it is possible to make $\delta = D$ so that the impedance $Z_\parallel$ becomes real and the matching problem is simplified.

The matching is accomplished by placing the quarter wave dielectric film 26 having an index of refraction $n_d$ between the magnetic film 25 and the prism 23. The effect of the quarter wave film is to transform the impedances $Z_\perp$ and $Z_\parallel$ to new impedances $Z'$ of the added film 26 according to $$Z_\perp' = N^2_d/Z_\perp \text{ and } Z_\parallel' = M_d^2/Z_\parallel$$

where $M_d$ and $N_d$ are the surface impedances which characterize the dielectric film 27 and furthermore $$M_d = \frac{1}{n_d^2 N_d}$$

The product $$Z_\perp' \cdot Z_\parallel' = \frac{1}{n_d^4 Z_\perp Z_\parallel}$$

which leads to optimum matching, when the transformed impedances $Z_\perp'$ and $Z_\parallel'$ equal to each other, then the relationship between $n_d$ and $n_k$ is found to be:

$$n_d = n_k \frac{(1 + Dn_j \sin \theta_j Imn^2)}{2|n|^2}$$

which must be satisfied by the index of refraction of the added film 26 to obtain the best possible dual-mode match with a single quarter-wave film.

As a numerical example, for $n_j$ of 1.7 (such as flint glass), $n_d \simeq n_k = 1.4$ (magnesium fluoride), $\theta_j 55°$, $n^2 = i10$:

$$n_d = 1.04 n_k$$

$$Z_\perp' = Z_\parallel' = 4.1$$

Matching would be perfect if $$Z_\perp' = Z_\parallel' = 1$$

With the values obtained in the numerical example, the energy conversion is found to be about 50% of the maximum possible with a perfect match. However, the relative values of $n_d$ and $n_k$ must be controlled to 1% in order to obtain these results.

Additional quarter wave films can be used to advantage. For example, a closer match can be obtained by substituting in place of film 26 a three layer composite film with indices $n_1 < n_2 < n_3$. Again setting the transformed impedances $Z_\perp'$ and $Z_\parallel'$ equal to each other, it is found that:

$$Z_\perp' = Z_\parallel' = \left(\frac{n^2}{n_3}\right)^2 \frac{|n|^2}{n_1^2 n_j \sin \theta_j}$$

with a condition on $n_1$ given by $$n_1 = n_k \left[1 + \left(\frac{\cos \theta_2}{\cos \theta_3}\right)^2 \frac{Dn_j \sin \theta_j Imn^2}{2|n|^2}\right]$$

As a numerical, for $n_1 = 1.4$ (MgF$_2$), $n_2 = n_j = 1.7$ (CaOSiO$_2$); $n_3 = 2.8$ (TiO$_2$), $\theta_j \simeq 55°$, $n^2 = i10$, it is found that the matching approaches 97% of the maximum possible with a perfect match.

In considering the various magneto-optical effects, it is necessary to point out that the transverse effect differs from the longitudinal and polar effects in that there is no direct transfer of energy (mode conversion) within the magnetic material between states of different polarization. Instead, the transverse effect is characterized by the absorption of energy depending on the direction of polarization of light passing through the material.

An example of one method of using the enhanced magneto-optical Kerr effect is to sense magnetically stored data using the difference between transverse and longitudinal magneto-optical coupling.

Still referring to FIGURE 2, consider film 25 represents a single memory cell which has been magnetized in the "zero" state to have a remanent magnetization lying in the plane of the film in the direction of arrow M and that this corresponds to the longitudinal direction with respect to the incident beam of light from source 21. Now if a magnetic field is applied from an external source, not shown, of sufficient intensity to switch the magnetization of film 25 to the opposite longitudinal direction, or the "one" state, by rotation in the plane of the film, then the magnetization must pass through an intermediate state which corresponds to the transverse orientation, M perpendicular to the plane of the paper, in which there is no mode conversion. Hence, a pulse of light will appear as the reflected beam passes through analyzer 28 during the switching operation and the initial presence of a "zero" is indicated in the output of detector 29. If a "one" is initially present, application of the external field has no effect on the magnetization and the absence of a light pulse signifies the presence of a "one."

For random access memory application, cells at many regions in space must be read. In comparatively small memory arrays a single large area illuminator and a single detector may be used. For large arrays selective illumination of selected cells or group of cells and a plurality of detectors may be required.

Figure 3:
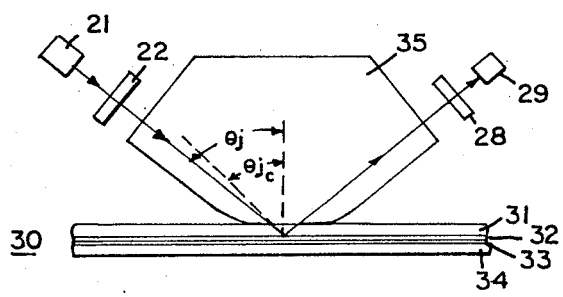
FIGURE 3 illustrates another form of the invention adapted for use with magnetic tape.

Optical read-out in this fashion is well suited to serial access read-out in which a tape or a drum can carry the multiple layer thin film structure past a read-out station. The structure of FIGURE 3 illustrates a modification of the invention for this purpose.

The tape, generally indicated as 30, consists of a sandwich of four materials. A dense dielectric material, such as "Mylar" with an index of refraction $n=1.7$, is the basic tape medium 31. A quarter-wave impedance matching film 32 such as MgF having an index of refraction of 1.4 is applied to tape 31. Next, the thin magnetic film 33 having a thickness $d$ such that $2\pi d/\lambda_0$ is of the order of $\frac{1}{10}$ and finally a rare dielectric material 34 having an index of refraction less than that of the quarter wave film 32.

Tape 30 is moved, as by motor driven reels not shown, past a transparent optical medium 35, such as dense flint glass of index of refraction substantially equal to that of tape 31. Optical medium 35 has the shape of a truncated prism in order to get polarized light from source 21 and polarizer 22 into the tape at an angle $\theta_j$ greater than the critical angle $\theta_{jc}$. In the same manner as before, the light reflected from the interface passes through analyzer 28 to detector 29.

The luminous flux per unit area transmitted by two polarizing elements, such as polarizer 22 and analyzer 28, is approximately equal to $\cos^2 \phi$, where $\phi$ is the angle between their transmission planes; when the elements are crossed ($\phi=90°$), the transmitted flux is ideally zero. The effect of the Kerr magneto-optical interaction can be considered to be a change in $\phi$, arbitrarily $+\Delta\phi$ for one direction of longitudinal magnetization and $-\Delta\phi$ for the other direction of longitudinal magnetization. When binary information is stored as the direction of magnetization in a given magnetic domain, one magnetization direction is assigned the significance of binary ONE and magnetization in the opposite direction, the significance of binary ZERO. Binary information stored on magnetic tape 30 in this fashion, will act to modulate the polarization of the reflected beam as the tape passes the read-out station, and, therefore, analyzer 28 can be adjusted so that the output of detector 29 is modulated by the information stored on the tape.

From the foregoing discussion, the structure of the present invention provides for the total reflection of polarized light at the interface between a dense optical medium and a rare optical medium, there being a very thin magnetic film and a quarter wave impedance matching dielectric film interposed between the rare medium and the dense medium.

In addition to the sensing of magnetic data storage, the above described apparatus is adaptable to the applications of high frequency light modulation and high speed light switch. These modifications and other modifications will be apparent to those skilled in the art without departing from the inventive concepts disclosed herein. Consequently, it is to be understood that the specific embodiments described are merely illustrative of the general principles of the invention and that the invention is limited only by the scope and spirit of the appended claims.

What is claimed is:

1. Apparatus for improving the mode conversion efficiency of the Kerr magneto-optical effects produced on a beam of polarized light by magnetic material with its magnetization oriented longitudinal to the plane of incidence of the beam comprising,
    a reactive mirror formed at the interface between a dense optical medium of high index of refraction and a rare optical medium of lower index of refraction when said beam of polarized light passes through said dense medium incident to said interface at an angle to the normal greater than the critical angle for total internal reflection to obtain stable reactive optical surface impedances,
    a film of magnetic material thinner than the optical penetration depth positioned at said interface to minimize optical loss,
    and a quarter wave dielectric film optical impedance matching network coating one surface of said magnetic film and adapted to match the mode conversion impedance of said magnetic film to said dense optical medium to maximize magneto-optical coupling,
    said dielectric impedance matching network being positioned between said magnetic film and said dense optical medium.

2. Apparatus as defined in claim 1 wherein said quarter-wave dielectric film optical impedance matching network is a single quarter wave film composed of a material having an index of refraction lower than the index of refraction of said dense optical medium and higher than the index of refraction of said rare optical medium.

3. Apparatus as defined in claim 1 wherein said quarter-wave dielectric film optical impedance matching network comprises a three layer composite film, in which the individual quarter-wave films have indices of refraction, $n_1$, $n_2$ and $n_3$ respectively, $n_1<n_2<n_3$, positioned so that the dielectric film with index $n_3$ abuts said dense optical medium.

4. Apparatus for sensing the Kerr magneto-optical mode conversion effect produced on a beam of polarized light by magnetic material oriented with its magnetization longitudinal to the plane of incidence of the beam comprising, a reactive mirror formed at the boundary between a dense optical medium and a rare optical medium having an index of refraction less than the index of refraction of said dense medium, means for transmitting a beam of polarized light through said dense medium incident to said boundary at an angle to the normal sufficiently greater than the critical angle for total reflection to obtain stable reactive optical surface impedances, a thin film of magnetic material placed at said boundary, a quarter-wave dielectric film impedance matching network interposed between said magnetic film and said dense medium, whereby the optical impedances of said magnetic film are matched to the wave impedance of free space for both modes of light polarization and means responsive to the beam of light reflected by said mirror for detecting polarization changes.

5. A multiple layer magnetic tape for magneto-optical sensing of stored information comprising, a long thin flat strip of optically dense dielectric material, a quarter-wavelength film of dielectric material having a smaller index of refraction than said strip coating one surface thereof, a thin film of magnetic material thinner than the optical penetration depth placed on the outer surface of said quarter-wavelength film, and an outermost layer of optically rare material having an index of refraction less than that of said strip, whereby light incident to the multiple layer interface in said strip is totally reflected at the boundary of said optically rare material for angles of incident greater than a critical angle determined by the ratio of the indices of refraction of said rare and dense materials.

6. Apparatus for the magneto-optical sensing of stored data comprising a multiple layer thin film magnetic tape adapted for the magnetic storage of binary data including a long thin flat strip of optically dense dielectric material, a quarter-wavelength film of dielectric material having a smaller index of refraction than said strip coating one surface thereof, a very thin magnetic film thinner than the optical penetration depth placed on the outer surface of said quarter-wavelength film and an outermost layer of optically rare material having an index of refraction less than that of said strip, a source of polarized light of predetermined wavelength, means for directing a beam of polarized light from said source incident to the multiple layer boundary at an angle of incidence greater than the critical angle for total internal reflection determined by the ratio of indices of refraction of said rare and dense materials, means for moving said tape past said beam of light, and means for detecting changes in the polarization of the beam of light reflected from said boundary.

References Cited

UNITED STATES PATENTS

| | | | |
|---|---|---|---|
| 3,224,333 | 12/1965 | Kolk et al. | 350—151 |
| 3,229,273 | 1/1966 | Baaba et al. | 350—151 X |

OTHER REFERENCES

Kolk et al.: Increasing the Kerr Magneto-Optic Effect in Thin Films," J. Applied Physics, vol. 34, No. 4 (part 2), p. 1060 (April 1963).

Supernowicz.: "Magneto-Optical Readout From a Magnetized Nonspecular Oxide Surface," J. Applied Physics, vol. 34, No. 4 (part 2), p. 1110 (April 1963).

Jenkins et al.: Fundamentals of Optics, McGraw-Hill Book Co., Inc., 1957, pp. 512–513.

DAVID SCHONBERG, *Primary Examiner.*

PAUL R. MILLER, *Assistant Examiner.*

U.S. Cl. X.R.

350—152, 166; 356—118